United States Patent [19]

Brede et al.

[11] Patent Number: 5,660,803
[45] Date of Patent: Aug. 26, 1997

[54] LIQUIFIED GAS-CONTAINING GENERATOR FOR AN INFLATABLE IMPACT PROTECTION CUSHION FOR PROTECTING A MOTOR-VEHICLE OCCUPANT AGAINST INJURY

[75] Inventors: Uwe Brede, Fürth; Alfred Hörr, Zirndorf; Josef Kraft, Berg; Heinz Riess, Fürth, all of Germany

[73] Assignee: Dynamit Nobel Aktiengesellschaft, Troisdorf, Germany

[21] Appl. No.: 162,896

[22] Filed: Dec. 8, 1993

[30] Foreign Application Priority Data

Dec. 8, 1992 [DE] Germany ............... 42 41 221.8

[51] Int. Cl.$^6$ ................................................. B60R 21/26
[52] U.S. Cl. ........................................ 422/305; 280/728.1
[58] Field of Search ..................... 422/305; 280/728, 280/736, 737, 741

[56] References Cited

U.S. PATENT DOCUMENTS

| 4,261,956 | 4/1981 | Adlhart ............. | 422/305 |
|---|---|---|---|
| 5,098,123 | 3/1992 | Jones ................ | 280/736 |
| 5,236,675 | 8/1993 | Swain et al. ....... | 422/305 |

FOREIGN PATENT DOCUMENTS

| 0 539 872 | 5/1993 | European Pat. Off. |
|---|---|---|
| 42 42 793 | 7/1991 | Germany. |
| 91/11347 | 8/1991 | WIPO. |
| 91/15381 | 10/1991 | WIPO. |

*Primary Examiner*—Timothy M. McMahon
*Attorney, Agent, or Firm*—Antonelli, Terry, Stout & Kraus

[57] ABSTRACT

A liquified gas-containing generator has a casing in which a reaction container containing liquified gas is accommodated. So as to trigger combustion of the liquified gas a puncture element with an overflow channel is driven into the reaction container. The kinetic energy for the puncture element is generated pyrotechnically by initiation of an ignition element. The ignition gases of the ignition element pass via the overflow channel into the interior of the reaction container where these gases induce combustion of the liquified gas. The combustion gases arising thereby pass via the overflow channel out of the reaction container into a hollow space in which the puncture element is arranged. The hollow space is sealed in relation to a discharge passage by a bursting membrane. This bursting membrane bursts open when a minimum pressure of the combustion gases is reached and thereby opens the way for discharge of the combustion gases out of the casing via the discharge passage.

8 Claims, 4 Drawing Sheets

LIQUIFIED GAS-CONTAINING GENERATOR FOR AN INFLATABLE IMPACT PROTECTION CUSHION FOR PROTECTING A MOTOR-VEHICLE OCCUPANT AGAINST INJURY

BACKGROUND OF THE INVENTION

The invention relates to a liquified gas-containing generator for an inflatable impact protection cushion for protecting a motor-vehicle occupant against injury.

With passive safety devices for motor vehicles in which driver and passenger are protected by inflatable impact protection cushions (also called airbags) against injury as a result of impact against the steering wheel or instrument panel, use is generally made of gas generators with a fixed propellent-charge unit for the purpose of gas generation. In this connection, use is made, for example, of a material based on sodium azide. A definite disadvantage of such gas generators is that the cinder particles arising in the course of combustion have to be retained by rather elaborate filter packets in order not to impinge, together with the combustion gases, upon the inside of the impact protection cushion, as a result of which the cushion could be damaged. For the purpose of additional protection against damage by means of particles the impact protection cushions are in part coated on the inside. As a result, the material for the impact protection cushion has more resistance to bending and can be accommodated less well and in less compressed manner in the module or container.

Efforts have recently been made to provide passive safety devices for motor vehicles of the above type equipped with liquified gas-containing generators. No solid particles arise in the course of combustion of the liquified gas, so that it is possible to do without filter packets. Accordingly it is also possible to do without an inner coating of the impact protection cushion. Together these two factors lead to reductions in weight and in space requirement of such devices.

So that gas generators only emit their combustion gases above a definite internal pressure and hence in reproducible and controlled manner, it is known to provide membrane-like elements which burst open above a definite pressure. By means of such membranes it is also possible to adjust the gas-generation rates and the time delay after which the impact protection cushion is inflated following triggering of the crash sensor. For safety reasons it is advantageous if this membrane-like part of the gas generator is only pressurized when the gas generator is ignited and if it is not under pressure when the gas generator is not ignited.

SUMMARY OF THE INVENTION

The object of the invention is to provide a liquified gas-containing generator of the type heretofore described with which gas can be generated in controlled and reproducible manner over the entire service life of the generator.

In order to achieve this object, the invention proposes a liquified gas-containing generator, the casing of which accommodates a closed reaction container for admission of liquified gas. The casing is constructed to include a hollow space which adjoins the reaction container when the reaction container is introduced. Arranged so as to be capable of being displaced in the hollow space is a puncture element or penetrating means which upon ignition of an ignition element is driven through the wall of the reaction container. The puncture element is provided with an overflow channel. Hence after the wall of the reaction container has been pierced by the puncture element a fluid connection exists via the overflow channel between the interior of the reaction container and the hollow space. A discharge passage leads out from the hollow space, said discharge passage likewise being formed in the casing. A connection between the discharge passage and the hollow space is sealed by a bursting membrane. The bursting membrane bursts open when a definite pressure is reached in the hollow space.

In order to trigger the liquified gas-containing generator according to the invention the ignition element thereof is ignited. The combustion gases which are formed upon ignition of the ignition element reach the hollow space and drive the puncture element through the wall of the reaction container. Thereupon the hot combustion gases of the ignition element pass via the overflow channel into the reaction container, where combustion of the liquified gas is initiated. As a consequence of the perforation of the wall of the container the combustion gases pass out of the reaction container into the hollow space via the overflow channel of the puncture element located in the wall of the reaction container. As soon as the combustion gases in the hollow space have reached a definite pressure the bursting membrane bursts open and opens a connection to the overflow channel. The combustion gases entering the discharge channel pass out of the gas generator via apertures in the casing, where the gases inflate the folded impact protection cushion.

With the liquified gas-containing generator according to the invention the bursting membrane is free from pressure when the gas generator has not been initiated. For elevated pressures do not arise in the hollow space so long as the reaction container is closed. The bursting membrane withstands the gas pressure of the hollow space arising upon ignition of the ignition element, and only bursts open when combustion gases flow out of the reaction container into the hollow space and exceed the minimum pressure determined by the design of the bursting membrane.

The bursting membrane of the gas generator according to the invention is, considered over the entire length of service of the gas generator, exposed essentially to the same environmental conditions. In particular, the static pressure of the liquified gas, which above the critical temperature at which the entire liquified gas has passed into the gas phase may be more than 100 bar, has no effect on the bursting membrane.

In an advantageous further development of the invention it is proposed that the puncture element has an end which faces the reaction container and which has a sharp cutting edge for puncturing the wall of the reaction container. The sharper the puncture element is at its end which penetrates the wall of the reaction container, the smaller need be the pyrotechnically generated propulsive forces in order to drive the puncture element through the wall of the reaction container. Hence, use can be made of ignition elements of smaller format and lower weight. Conversely, it is also possible for the wall of the reaction container to be designed to be stronger so as to serve as a diffusion barrier and to maintain the required pressure stability.

According to a further advantageous development of the invention the puncture element is constructed in the manner of a sheath which is guided so as to be capable of being displaced by sliding in the hollow space. In this connection the sheath has one axial end which faces the reaction container and which has a sharp cutting edge; at this axial end the sheath advantageously has a reduced outer diameter having only a small wall thickness. On the other hand, a second axial end of the sheath has an enlarged outer diameter and also an enlarged wall thickness; at this end the sheath is guided by an internal wall defining the hollow space. The annular surface at the axial end of the sheath facing away from the reaction container is dimensioned in such a way that the dynamic pressures arising in the hollow space upon ignition of the ignition element exert a sufficient impulse on the sheath for penetration of the wall of the reaction container.

In the position in which it is located prior to ignition of the ignition element, the puncture element preferably closes off a discharge opening of the discharge passage leading from the hollow space and thereby also the bursting membrane.

According to a further advantageous development of the invention the gas-tight reaction container is designed to be stable under its own pressure and under bursting pressure. Hence the reaction container itself is capable of resisting the internal pressures of up to 1000 bar occurring in the course of combustion of the liquified gases in the reaction container. Hence the reaction container withstands both the static pressures (in the temperature range of −35° C. to +110° C. this pressure amounts to 10 to 150 bar) and also the dynamic pressures. With such a reaction container which is stable under bursting pressure, the contribution which the casing of the generator makes to pressure stability is of far less significance. The casing merely has a holding and positioning function. Hence the possibility arises of suitably designing the casing with regard to the space requirement. In this connection, it is particularly advantageous to design the casing in such a way that it is a part of the module container in which the impact protection cushion is accommodated folded-up and which is provided with the sealing cover facing the occupant to be protected, said sealing cover opening in the event of the impact protection cushion inflating. As a result of the integration of the generator casing into the case of the module, it is possible to reduce the constructional depth of the module. Provided that the casing of the gas generator is a component of the module, it is necessary to provide for a positive and functionally tight coupling of the module to the case, unless the casing of the gas generator is integral with the case of the module. However, this last variant entails manufacturing problems when one considers that the case of the module consists of plastics, which is the normal case. To this extent it is more favorable to manufacture the case and the casing of the gas generator separately and to link them to one another in positive and functionally tight manner by means of a suitable connection. In this context, functionally tight means that the combustion gases passing out of the casing of the gas generator and reaching the case are unable to escape via the junction between the casing of the gas generator and the case and consequently are fully available for inflation of the impact protection cushion. When the impact protection cushion is inflated the internal pressures prevailing in the module amount to just a few bar.

The liquified gas-containing generator according to the invention may also be constructed in such a way that the reaction container merely has the function of diffusion barrier for achieving gas impermeability in the event of long-term storage, and that accordingly the resistance to pressure is provided by the surrounding casing structure. The reaction container can therefore be constructed to have relatively thin walls, which has the advantage that the wall can be easily punctured by the puncture element.

A further advantage is that various materials (e.g., metals or reinforced plastic) for structure (for solidity) and reaction container (for tightness) can be chosen, depending on the type of the liquified gas and on the operating pressures.

BRIEF DESCRIPTION OF THE DRAWINGS

Various embodiments of the invention are described in more detail below with reference to the accompanying drawings wherein.

DETAILED DESCRIPTION OF THE INVENTION

Figure 1:
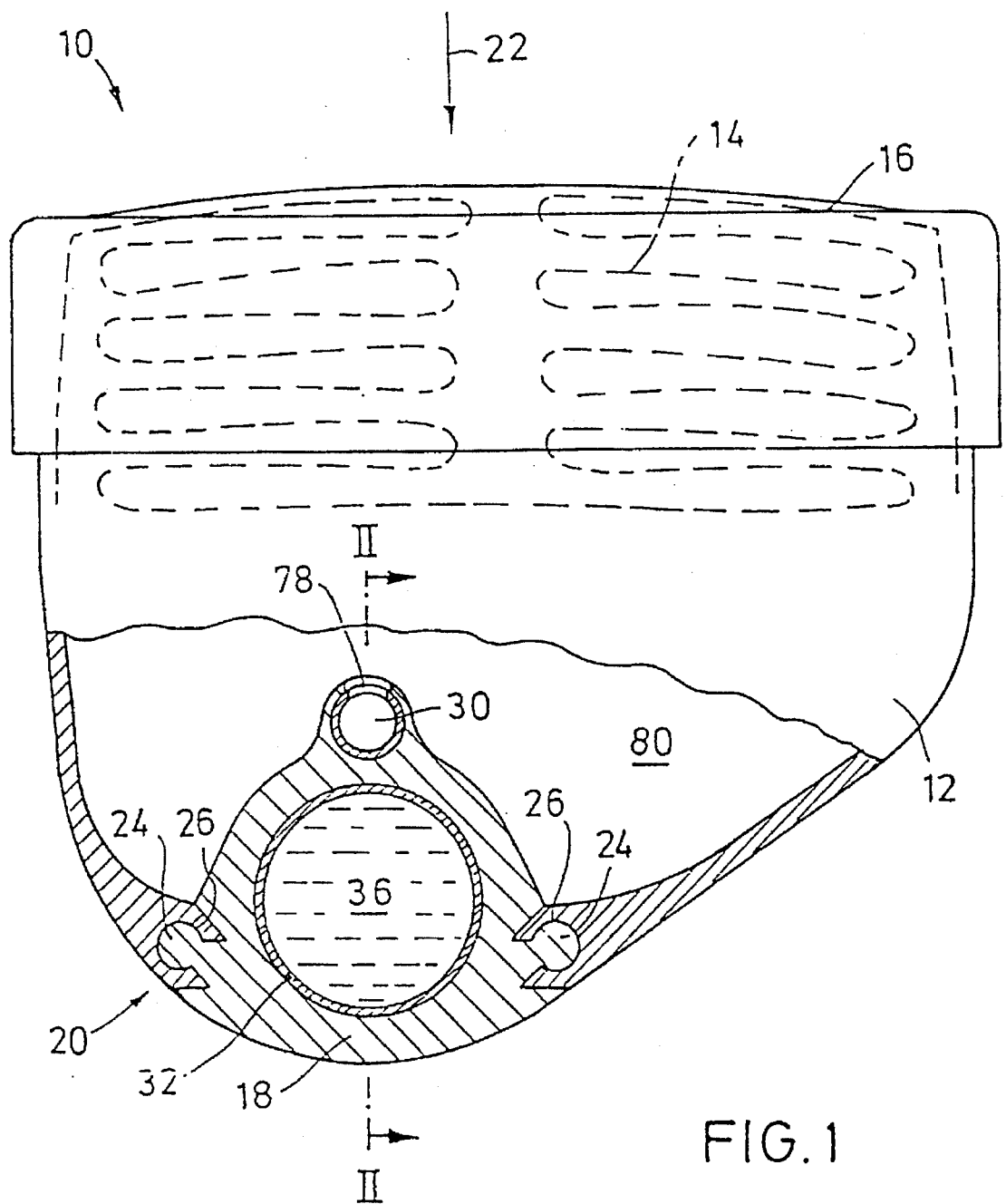
FIG. 1 is a side view partially in cross-section of a module of a passive safety device with an inflatable impact protection cushion, partly cut away.

An installation module 10 of a passive safety device for protecting motor-vehicle occupants against impact injuries is shown partially in section in a side view in FIG. 1. Module 10 has a case 12 which is open on one side and made of plastic, the open side of said case being closed by the fabric material of an impact protection cushion 14. A plastic cover 16 is attached to the case 12, said cover opening when the impact protection cushion is inflated. An integral component of the case 12 is the casing or housing 18 of a liquified gas-containing generator 20. The case 12 has a rectangular shape in plan view (in the direction of the arrow 22), with the liquified gas-containing generator 20 extending over the entire longitudinal direction of the case 12. The casing 18 of the liquified gas-containing generator 20, which can consist of metal or fibre-reinforced plastic, has on two longitudinal sides (or side walls) facing away from each other, beads 24 which protrude longitudinally. The beads 24 are exposed over more than 270° of their peripheral surface and are connected in a remaining projecting portion to the casing 18. At each of the boundary portions of the case 12 which are facing each other and adjacent to the casing 18, the case has a groove 26. The grooves 26 have cross-sections corresponding to the configuration of beads 24. For assembly of the module, the beads 24 of the casing 18 are introduced into the open grooves 26, and in this manner the casing 18 is pushed laterally into the case 12. By virtue of the way it is connected, the casing 18 is connected to the case 12 in a positive and functionally tight manner.

Figure 2:
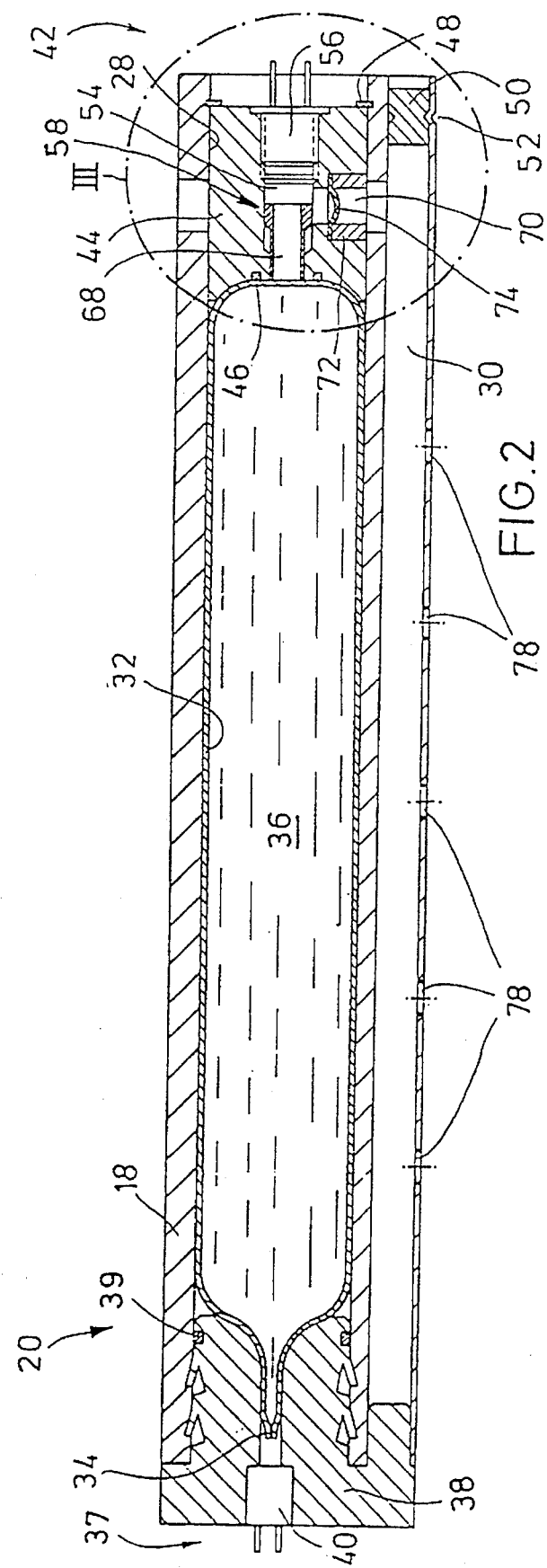
FIG. 2 is a longitudinal section through the gas generator of the module of FIG. 1 along line II—II of FIG. 1.

The construction and the mode of operation of the liquified gas-containing generator are described in detail hereinafter. According to FIG. 2 the casing 18, which may be an extrusion section, is elongated. Casing 18 defines a hollow section or chamber with a first comparatively large through-opening 28 and a second comparatively small through-passage 30. Both the through-opening 28 and the through-passage 30 run in the axial direction of the casing. A cartridge-like reaction container 32 with a comparatively small wall thickness is introduced into the casing via the through-opening 28. The reaction container is a container with an open end which is sealed at a tapered end 34 so as to be gas-tight. Combustible liquified gas 36, which has a known composition, is contained in the reaction container 32. The axial length of the reaction container 32 is smaller than that of the casing 18. At the end 37 of the casing 18 which faces the closed end 34 of the reaction container 32, the casing 18 is sealed by a stopper 38. The stopper 38, as shown in FIG. 2, is adapted to the bit around the 'bottle neck' of the reaction container 32 at the sealed end thereof 34 and in this section engages with an inner wall of the through-opening 28. The stopper 38 is sealed off from the casing 18 by means of a washer 39. The stopper 38 carries a gas sensor 40 which detects gas which may possibly escape from the sealed end 34 of the reaction container 32.

Besides closing off the through-opening 28, the stopper 38 also closes off the through-passage 30 at the end 37 of the casing 18, as shown in FIG. 2.

The other axial end 42 of the casing 18 is also closed off by an essentially cylindrical stopper 44. On its inner side facing the reaction container 32 the stopper 44 is adapted to conform to the shape of the reaction container 32. The stopper 44 is sealed off from the reaction container 32 by a washer 46. The stopper 44 is secured in the through-opening 28 by a spring washer 48 which on an outerside is adjacent to the stopper 44 and partly projects into a circular groove on the inside surface or wall of the through-opening 28. At the end 42 of the casing 18 the through-passage 30 thereof is closed off by a separate stopper 50 which is held by a constriction 52 of the casing 18 or by a dowel pin in the through-passage 30 in a manner so as to be secured against axial displacement.

The design of the stopper 44 at the end 42 of the casing is described hereinafter with reference to FIG. 3. The stopper 44 has an axial internal passage 53 which constitutes a hollow space 54. Located in the hollow space 54 is a pyrotechnical ignition element 56 which is capable of being triggered electrically and which is screwed into the end of the passage 53 of the stopper 44 which faces the end 42 of the casing or is firmly connected in some other way. The passage 53, which except for the threaded section is smooth, furthermore accommodates a sheath-like puncture element 58 which is guided so as to be capable of being axially displaced in the passage 53. The puncture element 58 has a sharp-edged end 60 adjacent to the front end of the reaction container 32. At the end 60 the puncture element 58 has a comparatively small wall thickness; the puncture element 58 is formed at its end 60 with an outer polished surface 62 in the manner of a cup point. The other axial end 64 facing the ignition element 56 has an outer diameter that is larger in relation to the end 60 and also a greater wall thickness. The sheath-like puncture element 58 is provided with a conical exterior surface 66 in the region between the two ends 60 and 64. By virtue of its sheath-like form the puncture element 58 has a central through-passage 68 (or overflow channel). The passage 53 through the stopper 44 narrows at the end of the stopper 44 adjacent to the reaction container 32. In this section the passage 53 is closely adjacent to the end 60 of the sheath-like puncture element 58; the other end 64 is guided in the passage 53 in the region thereof of greater diameter.

The hollow space 54 and the through-passage 30 are connected to each other via a radial passage 70. The passage 70 consists of a first section which is formed in the stopper 44 and a second section which is formed in the casing 18. Both sections of the passage 70 are aligned with each other when a stopper 44 is inserted and suitably oriented. Inserted in the section of the passage 70 located in the stopper 44 is a hollow cylindrical insert 72 which carries a bursting membrane 74. The hollow space 54 is sealed in relation to the through-passage 30 by means of the bursting membrane 74 which is supported on a shoulder of the stopper 44 and held between the cylindrical connecting piece 72 and the stopper 44.

The gas generator 20 according to FIG. 2 is assembled as follows. Firstly the extrusion section of the casing 18 is closed off at one of its two ends 37,42 by the corresponding stopper(s) 38,44,50. Then the reaction-container cartridge 32 is pushed into the through-opening and the casing is sealed on its side which is then still open by means of the appropriate stopper(s). In this regard the modular construction of the casing 18 of the liquified gas-containing generator 20 is advantageous. Reaction container 32, ignition mechanism and bursting membrane are separate elements which are put together in the manner described above and shown in FIGS. 1–3, and which are assembled to form the liquified gas-containing generator 20. In this connection it should also be noted that the hollow cylindrical connecting piece 72 is introduced, prior to assembly of the stopper 44, into the section thereof defining the passage 70 together with the bursting membrane 74. The mode of operation of the gas generator according to FIG. 2 will be described briefly hereinafter. In order to activate the liquified gas-containing generator 20 the ignition element 56 thereof is ignited, this occurring as a result of an electrical impulse in reply to a response of the crash sensor. As a consequence of the ignition of the electrical ignition element 56, combustion gases are formed in the hollow space 54, the dynamic pressures of said combustion gases being sufficient to move the puncture element 58 forward, by means of the annular front face of the end 64, with an impulse which is sufficient to puncture the reaction container 32. In this connection, the puncture element 58 presses itself, by virtue of its end 60 which is provided with an outer polished surface 62, through the wall of the reaction container 32. The puncture element 58 is driven into the reaction container 32 until the conical outer surface 66 is adjacent to a conical inner surface 76 of the passage 53 of the stopper 44. The pressure of the combustion gases of the ignition element 56 in the hollow space 54 is not sufficient to burst open the bursting membrane 74. When the puncture element 58 is located in the wall of the container 32 the ignition gases from the ignition element 56 enter the inside of the reaction container 32, where they initiate combustion of the liquified gas 36. In the course of combustion of the liquified gas 36, combustion gases escape from the reaction container 32 into the hollow space 54 via the overflow opening 68 of the puncture element 58. As soon as the combustion gases in the hollow space 54 have reached a certain pressure, the bursting membrane 74 bursts open. The pressure at which the bursting membrane 74 bursts open is determined by the design of the bursting membrane 74. After the bursting membrane 74 has burst open, a connection exists between the hollow space 54 and the through-passage 30 via the passage 70, so that the combustion gases enter the through-passage 30. The combustion gases leave the through-passage 30 via radial apertures 78 in the casing 18 and enter the space 80 surrounded by the module case 12 (see FIG. 1). By suitable choice of the bursting membrane and a corresponding choice of the cross-section of the passage 70 it is possible to influence the inflation characteristics of the impact protection cushion.

Furthermore, the use of the bursting membrane 74 also has, in a way, an effect of evening-out the gas-generation rate over the entire range of operating temperatures to be considered, namely −35° to +85° C. if one assumes that, depending on the material, the pressure at which the bursting membrane opens is inversely proportional to the operating temperature, and that combustion of the liquified gas takes place more quickly the higher the operating temperature, it becomes clear that these two dependencies compensate each other over the entire range of operating temperatures, in particular so as to achieve equalization of the gas-generation rate at which the liquified gas-containing generator 20 generates the gas for inflating the impact protection cushion.

Figure 3:
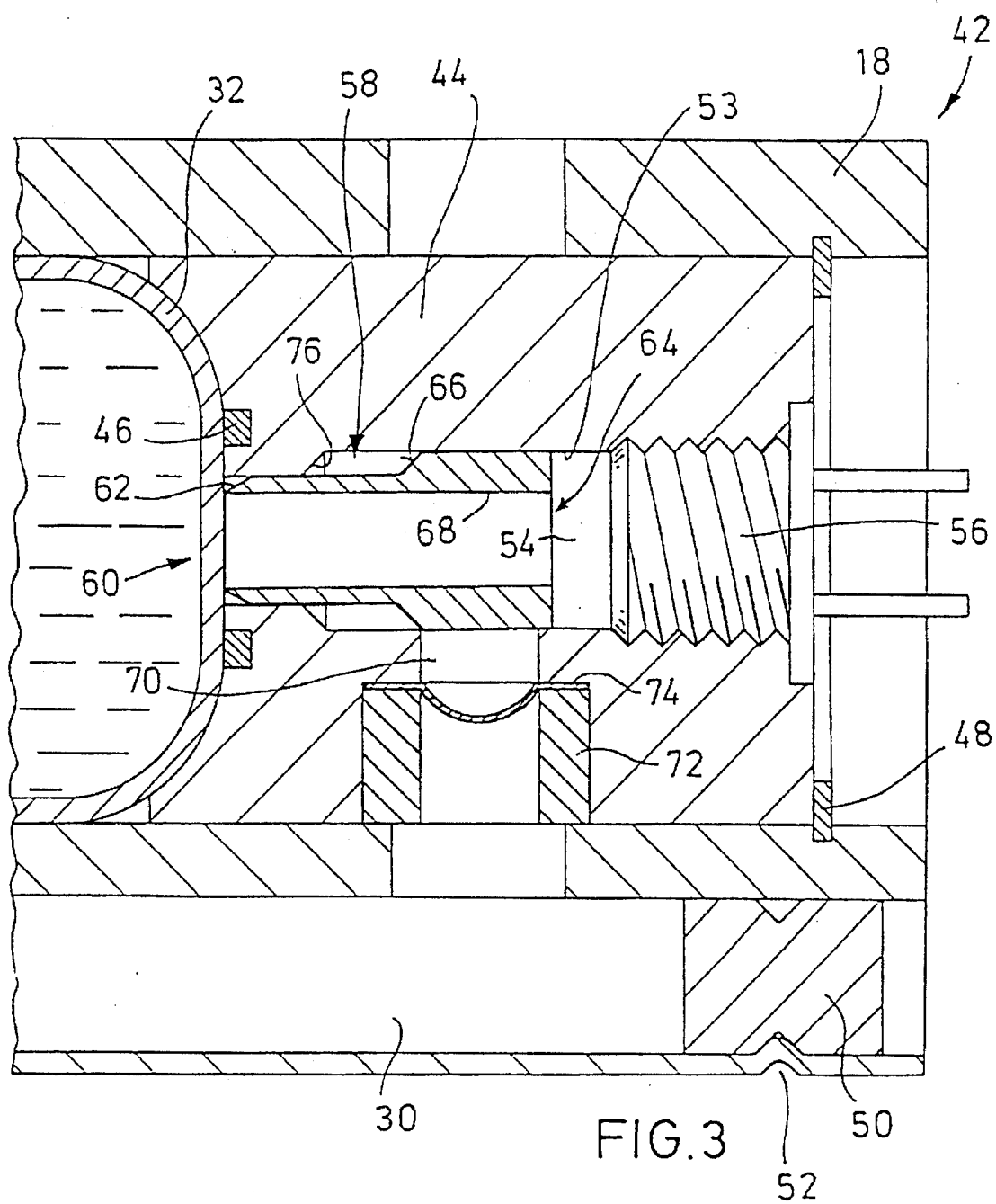
FIG. 3 is a sectional view, on an enlarged scale, of the region of the gas generator enclosed by a dash-dot line in FIG. 2.
Figure 4:
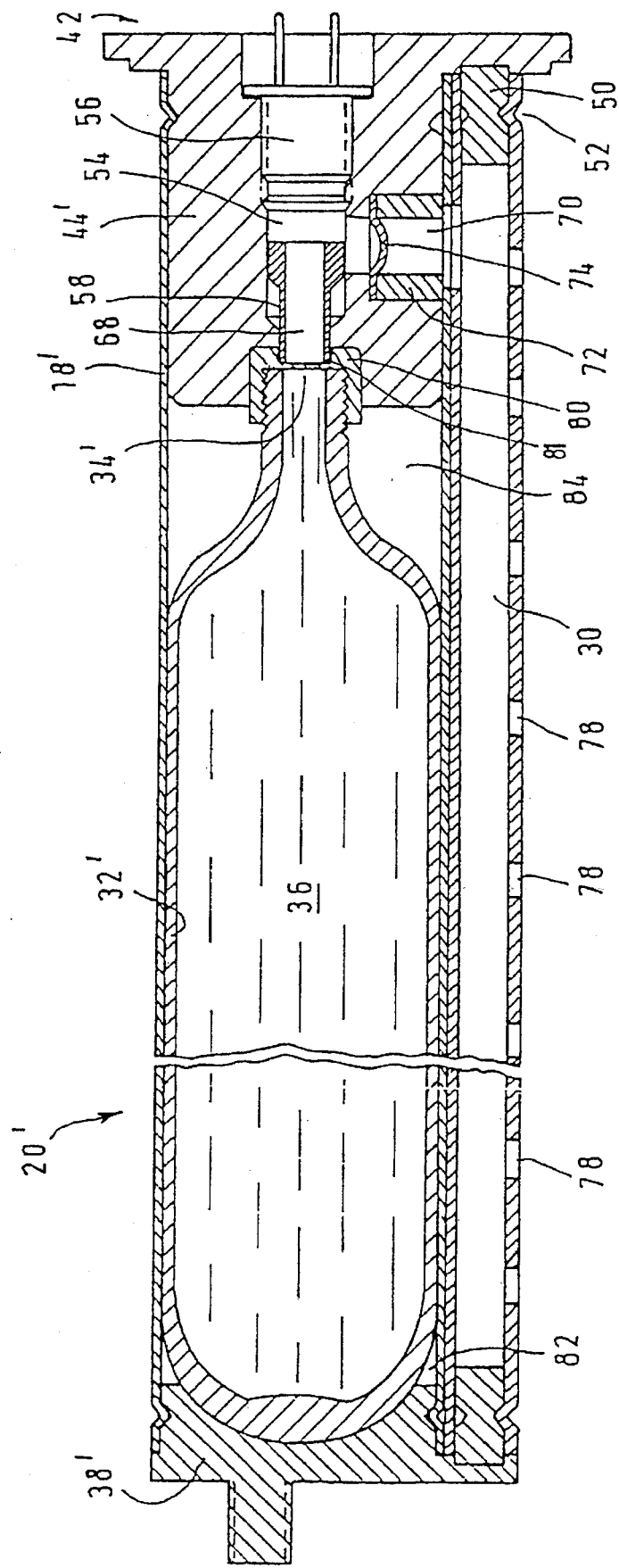
FIG. 4 shows an alternative embodiment of the gas generator of the invention in a longitudinal section.

A second embodiment of a gas generator 20' is represented in longitudinal section in FIG. 4; to the extent that the components of the gas generator 20' are the same as those of the gas generator 20 of FIGS. 2 and 3, these components are provided in FIG. 4 with the same reference numbers. In contrast to the gas generator 20 according to FIGS. 2 and 3, in the case of the gas generator 20' of FIG. 4, the 'bottle neck' end of the reaction container 32' faces the stopper 44', in the hollow space 54 of which a puncture element 58 is arranged. The reaction container 32', which is constructed so as to be stable both under its own pressure and under bursting pressure, is sealed so as to be gas-tight at its open end 34' (bottle neck) by means of a sealing cap 80. This sealing cap 80 is exposed to the puncture element 58 and is punctured by the element 58. The sealing cap 80 has a central recess 81 continuing the hollow space 54 at the end thereof facing the reaction container 32'. The thickness of the sealing cap 80 in the region of the recess 81 situated opposite the sharp-edged end 60 of the puncture element 58 is chosen to be so large that the sealing cap 80 withstands the static internal pressures (depending on temperature, up to about 150 bar), so that the reaction container 32' is also dimensionally stable in the region of its sealing cap 80. The reduced wall thickness of the sealing cap 80 in the region of its recess 81 eases puncture by the puncture element 58. Otherwise, the wall thickness of the reaction container 32' is chosen to be so large that the container also withstands the dynamic pressures arising in the course of combustion of the liquified gas 36, so that it is stable when bursting occurs. Hence, the stoppers 38' and 44' at the bottom and at the 'bottle neck' of the reaction container 32' also do not have to adjoin the reaction container 32' entirely by means of positive closure, and instead hollow spaces 82 and 84 remain.

What is claimed is:

1. A liquified-gas generator for an inflatable impact protection cushion for protecting a motor-vehicle occupant against injury, which comprises:

a casing;

a closed reaction container arranged within the casing and containing liquified gas;

a hollow space in the casing, said hollow space adjoining the reaction container;

an ignition element;

a puncture element arranged in the hollow space and capable of being displaced in the hollow space for penetrating the wall of the reaction container in the event of initiation of the ignition element, said puncture element having an overflow channel, whereby combustion gases of the liquified gas pass out of the reaction container through the overflow channel in the puncture element into the hollow space;

a discharge passage opening into the hollow space for carrying the combustion gases arising in the course of combustion of the liquified gas out of the casing; and a bursting membrane which seals the discharge passage in relation to the hollow space and which bursts open when a minimum pressure of the combustion gases in the hollow space is reached.

2. A liquified gas-containing generator according to claim 1, wherein the puncture element has a sharp-edged cutting end facing the reaction container for the purpose of penetrating the wall of the reaction container.

3. A liquified gas-containing generator according to claim 1, wherein the puncture element is constructed as a sheath or tubular element and the axial end of which facing the reaction container is provided with a cutting edge, and another axial end of which has an enlarged outer diameter and an enlarged wall thickness, the sheath being guided so as to be capable of being displaced by sliding in the hollow space.

4. A liquified gas-containing generator according to claim 2, wherein the puncture element is constructed as a sheath or tubular element and the axial end of which facing the reaction container is provided with a cutting edge, and another axial end of which has an enlarged outer diameter and an enlarged wall thickness, the sheath being guided so as to be capable of being displaced by sliding in the hollow space.

5. A liquified gas-containing generator according to claim 1, wherein the puncture element, in a position adjacent to the wall of the reaction container, closes off a discharge opening of the discharge passage which opens into the hollow space.

6. A liquified gas-containing generator according to claim 1, wherein the reaction container is constructed of thin-walled material and is surrounded by the casing, with the casing being constructed of material which is sufficiently stable under pressure.

7. A liquified gas-containing generator according to claim 1, wherein the reaction container is constructed of material of sufficient strength so that the construction is stable under pressure of the liquified gas and under the bursting pressure generated by the combustion of the liquified gas.

8. A liquified gas-containing generator according to claim 1, wherein the casing is provided with a coupling for the purpose of connecting with a case which adjoins the casing and which contains the impact protection cushion, the coupling and the case being constructed in such a way that the casing is capable of being connected with the case in a positive and functionally tight manner.

* * * * *